(12) United States Patent
Gu et al.

(10) Patent No.: US 12,206,261 B2
(45) Date of Patent: Jan. 21, 2025

(54) CONTROL METHOD, ELECTRONIC DEVICE, AND WRITING INTERACTION DEVICE

(71) Applicant: Lenovo (Beijing) Limited, Beijing (CN)

(72) Inventors: Jinhua Gu, Beijing (CN); Changfu Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 120 days.

(21) Appl. No.: 17/994,105

(22) Filed: Nov. 25, 2022

(65) Prior Publication Data
US 2023/0170745 A1 Jun. 1, 2023

(30) Foreign Application Priority Data

Nov. 30, 2021 (CN) .......................... 202111451838.9

(51) Int. Cl.
*H02J 50/80* (2016.01)
*G06F 13/42* (2006.01)
*H02J 7/00* (2006.01)
*H02J 50/90* (2016.01)

(52) U.S. Cl.
CPC .......... *H02J 50/80* (2016.02); *G06F 13/4221* (2013.01); *H02J 7/00034* (2020.01); *H02J 50/90* (2016.02); *G06F 2213/0024* (2013.01)

(58) Field of Classification Search
None
See application file for complete search history.

(56) References Cited

U.S. PATENT DOCUMENTS

| | | | |
|---|---|---|---|
| 2010/0225272 A1* | 9/2010 | Kirby | H04B 5/70 320/108 |
| 2016/0285299 A1* | 9/2016 | Amand | H02J 50/80 |
| 2017/0117735 A1* | 4/2017 | Liao | H02J 7/0068 |
| 2018/0026469 A1* | 1/2018 | Kamath et al. | H01J 7/04 320/106 |
| 2020/0014235 A1* | 1/2020 | Lin | H02J 7/007194 |
| 2020/0092379 A1* | 3/2020 | Leege | B60L 53/30 |
| 2020/0412131 A1* | 12/2020 | Bai | H02J 50/80 |
| 2021/0399568 A1* | 12/2021 | Huang | H02J 7/0047 |

* cited by examiner

*Primary Examiner* — Henry Tsai
*Assistant Examiner* — Harry Z Wang
(74) *Attorney, Agent, or Firm* — ANOVA LAW GROUP, PLLC

(57) ABSTRACT

A control method includes in response to a predetermined contact event between a writing interaction device and an electronic device, performing, by the electronic device, a charging protocol adaptation process on the writing interaction device to obtain a target charging protocol to be adopted, performing a charging process for the writing interaction device based on the target charging protocol, and obtaining one or more communication protocol parameters transmitted by the writing interaction device using the target charging protocol during the charging process, identifying a target communication protocol adopted by the writing interaction device based on the one or more communication protocol parameters, and controlling the target communication protocol to take effect on the electronic device to communicate with the writing interaction device based on the target communication protocol in response to the electronic device receiving an interaction operation of the writing interaction device.

20 Claims, 4 Drawing Sheets

CONTROL METHOD, ELECTRONIC DEVICE, AND WRITING INTERACTION DEVICE

CROSS-REFERENCE TO RELATED APPLICATION

The present application claims priority to Chinese Patent Application No. 202111451838.9, filed Nov. 30, 2021, the entire content of which is incorporated herein by reference.

TECHNICAL FIELD

The present disclosure relates to the field of writing interaction applications and, in particular, to a control method, an electronic device, and a writing interaction device.

BACKGROUND

A writing interaction device can perform touch operations such as high-precision writing or painting operations on an electronic device such as a tablet, a mobile phone, or a personal computer (PC), reaching a precision that human fingers cannot achieve. To achieve high precision and rapid positioning, the electronic device and the writing interaction device need to communicate continuously through wireless signals.

With the development of writing interaction device technology, writing interaction devices have become popular. However, nowadays, there is no unified organization and standard to regulate the communication between writing interaction devices and electronic devices that can be generally used for different writing interaction devices or products of a same company.

SUMMARY

In accordance with the disclosure, there is provided a control method including in response to a predetermined contact event between a writing interaction device and an electronic device, performing, by the electronic device, a charging protocol adaptation process on the writing interaction device to obtain a target charging protocol to be adopted, performing a charging process for the writing interaction device based on the target charging protocol, and obtaining one or more communication protocol parameters transmitted by the writing interaction device using the target charging protocol during the charging process, identifying a target communication protocol adopted by the writing interaction device based on the one or more communication protocol parameters, and controlling the target communication protocol to take effect on the electronic device to communicate with the writing interaction device based on the target communication protocol in response to the electronic device receiving an interaction operation of the writing interaction device.

Also in accordance with the disclosure, there is provided a control method including based on a predetermined contact event between a writing interaction device and an electronic device, transmitting one or more protocol parameters of a charging protocol adopted by the writing interaction device to the electronic device, to enable the electronic device to perform a charging protocol adaptation process on the writing interaction device to obtain a target charging protocol to be adopted based on the one or more protocol parameters, based on the target charging protocol, performing a charging process to the writing interaction device using a power provided by the electronic device, and during the charging process, transmitting one or more communication protocol parameters to the electronic device using the target charging protocol, to enable the electronic device to identify a target communication protocol adopted by the writing interaction device based on the one or more communication protocol parameters and control the target communication protocol to take effect on the electronic device.

Also in accordance with the disclosure, there is provided an electronic device including a memory storing a computer instruction set, and a processor configured to execute the computer instruction set to: in response to a predetermined contact event between a writing interaction device and the electronic device, perform a charging protocol adaptation process on the writing interaction device to obtain a target charging protocol to be adopted, perform a charging process for the writing interaction device based on the target charging protocol, and obtain one or more communication protocol parameters transmitted by the writing interaction device using the target charging protocol during the charging process, identify a target communication protocol adopted by the writing interaction device based on the one or more communication protocol parameters, and control the target communication protocol to take effect on the electronic device to communicate with the writing interaction device based on the target communication protocol in response to the electronic device receiving an interaction operation of the writing interaction device.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

A control method, an electronic device, and a writing interaction device consistent with the embodiments of the present disclosure are provided. The control method includes a control method applied to an electronic device and a control method applied to a writing interaction device.

The electronic device may be, but is not limited to, a smart phone, a tablet computer, a personal digital assistant (PDA), a PC, or a multi-processor device that have a writing interaction function and can perform writing interaction with the writing interaction device. The writing interaction device may be, but is not limited to, a stylus that can be applied to a natural person user and/or a non-natural person user (e.g., an intelligent robot with automatic writing function) that has a writing interaction function with the electronic device.

Figure 1:
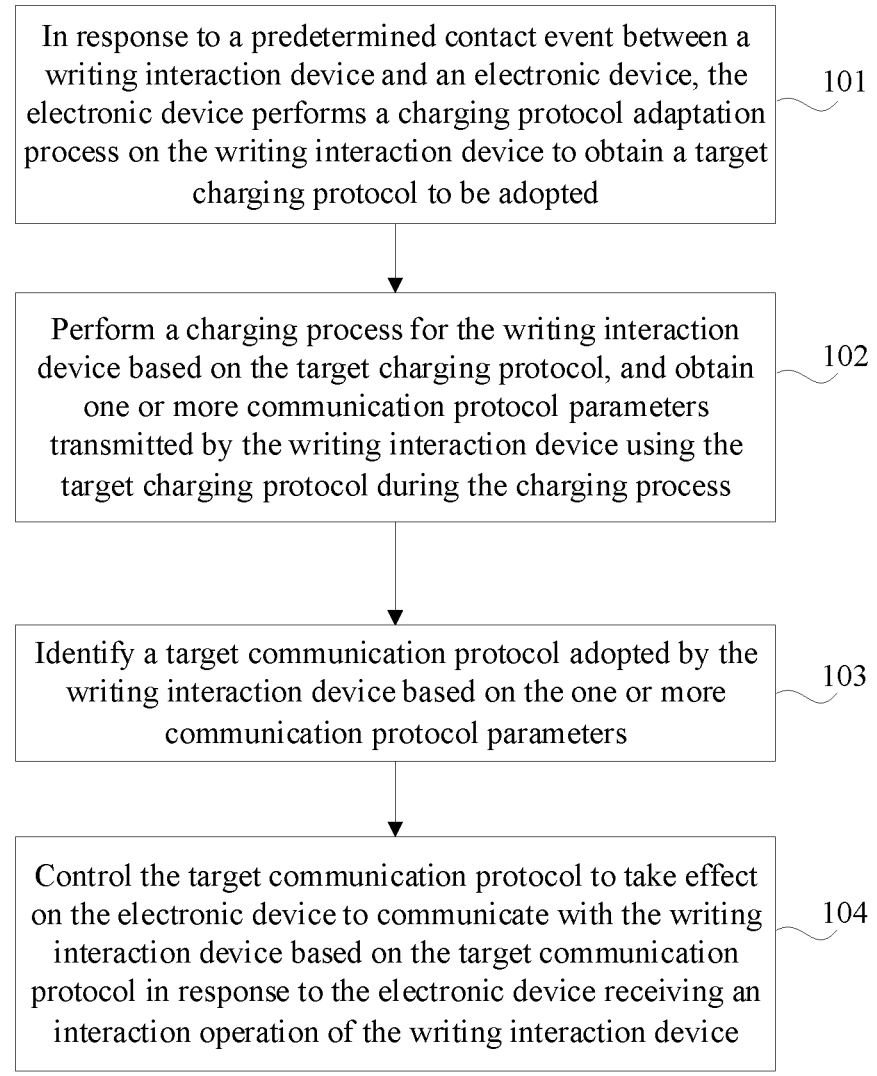
FIG. 1 is a schematic flow chart of a control method applied to an electronic device consistent with the embodiments of the disclosure.

FIG. 1 is a schematic flow chart of a control method applied to an electronic device consistent with the embodiments of the disclosure. As shown in FIG. 1, the control method includes the following processes.

At 101, in response to a predetermined contact event between a writing interaction device and an electronic device, the electronic device performs a charging protocol adaptation process on the writing interaction device to obtain a target charging protocol to be adopted.

The charging protocol for the writing interaction device may be charging protocols of different manufacturers or charging protocols of different versions of a same manufacturer. The predetermined contact event includes a contact event between the writing interaction device and the electronic device that satisfies a preset position condition.

For a wireless charging protocol, the contact event that satisfies the preset position condition may refer to a contact event that can match a position of a wireless charging receiver of the writing interaction device and a position of a wireless charging transmitter of the electronic device, to ensure that the writing interaction device can be effectively charged. The position condition can be set as a relative position between the writing interaction device and the electronic device to match the position of the wireless charging receiver of the writing interaction device and the position of the wireless charging transmitter of the electronic device to ensure that the writing interaction device can be effectively charged.

In some embodiments, to generate the contact event that satisfies the preset position condition, a user can perform a contact operation between the writing interaction device and the electronic device with a charging method of the writing interaction device, such as based on a magnetic attachment wireless charging of a stylus, the stylus is magnetically attached to a predetermined position on a side of the electronic device such as a tablet, or the stylus is simply contacted/touched with the tablet according to an attachment direction and an attachment position.

Figure 2:
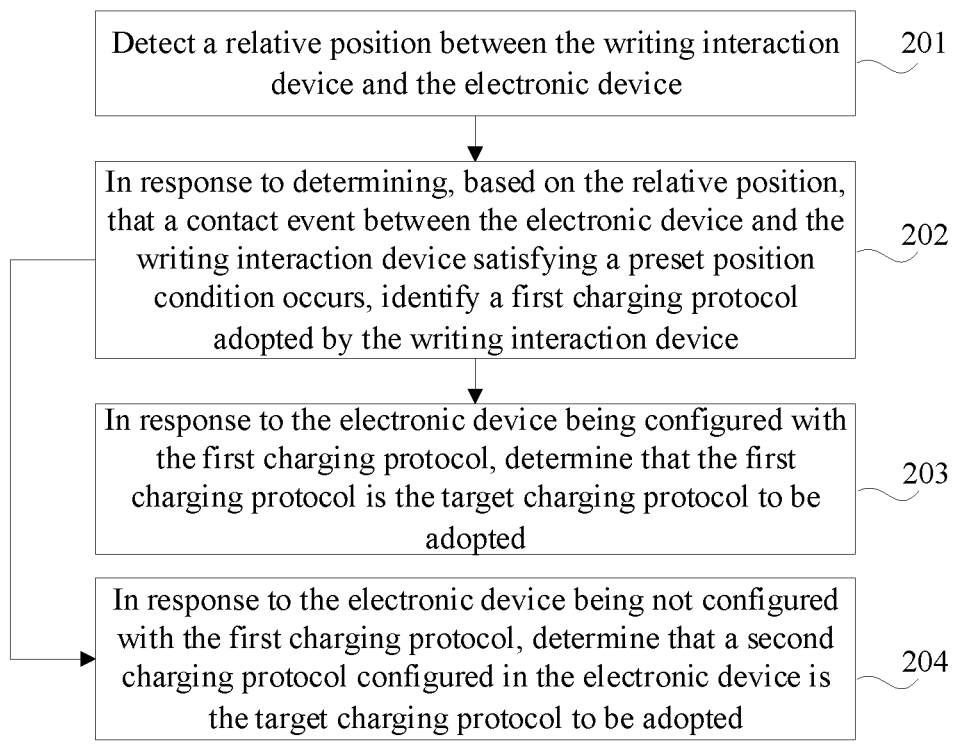
FIG. 2 is a schematic flow chart of a charging protocol adaptation process performed by an electronic device consistent with the embodiments of the disclosure.

The electronic device may detect the contact event, and in response to the contact event, perform the charging protocol adaptation process on the writing interaction device to obtain the target charging protocol to be adopted. FIG. 2 is a schematic flow chart of a charging protocol adaptation process performed by an electronic device consistent with the embodiments of the disclosure. As shown in FIG. 2, the charging protocol adaptation process includes the following processes.

At 201, a relative position between the writing interaction device and the electronic device is detected.

In some embodiments, the electronic device may perform a magnetic attachment detection, and indirectly identify the relative position between the writing interaction device and the electronic device through the magnetic attachment detection. In some embodiments, the electronic device may detect the relative position between the writing interaction device and the electronic device using a combination of distance detection based on a distance sensor and image detection of the image acquisition device (such as a camera), which is not limited.

At 202, in response to determining, based on the relative position, that a contact event between the electronic device and the writing interaction device satisfying a preset position condition occurs, a first charging protocol adopted by the writing interaction device is identified.

The first charging protocol is a charging protocol adopted or expected to be adopted by the writing interaction device, which may be an optimal charging protocol that can be applied to the writing interaction device and provide optimized charging parameters (for example, a maximum charging power to achieve fast charging) for charging the writing interaction device.

In response to a contact event between the writing interaction device and the electronic device that satisfies the position condition occurring, the writing interaction device transmits the protocol parameters of the first charging protocol adopted by the writing interaction device to the electronic device based on the contact event. The protocol parameters transmitted may include, but not limited to, a protocol type, an identification, a name, or a version number of the first charging protocol.

To support a successful adaptation of the charging protocol between the electronic device and the writing interaction device, in addition to the adopted first charging protocol configured in the writing interaction device, the writing interaction device is also configured with a second charging protocol used as a backup charging protocol. A charging parameter value provided by the second charging protocol is lower than a preset corresponding parameter threshold. For example, a charging power provided by the second charging protocol is lower than a preset power threshold, so that the second charging protocol can be universally used for charging different types of writing interaction devices. That is, the second charging protocol is a basic charging protocol, which can ensure that various types/models of writing interaction devices can be charged with minimum configuration charging parameters, thereby achieving a universality of charging of the various types/models of the writing interaction devices.

The charging parameter value provided by the second charging protocol is lower than a charging parameter value provided by the first charging protocol. For example, the charging power provided by the second charging protocol is lower than a charging power provided by the first charging protocol.

In some embodiments, after the contact event occurs, the writing interaction device may directly transmit relevant protocol parameters of the first charging protocol to the electronic device based on the first charging protocol. In some embodiments, the writing interaction device may also transmit the relevant protocol parameters of the first charging protocol to the electronic device using the second charging protocol. A certain field of a corresponding data packet of the first charging protocol containing the protocol parameters such as the protocol type and version number of the first charging protocol may be used to transmit protocol parameter information to the electronic device. Alternately, a certain field of a corresponding data packet of the second charging protocol containing the protocol parameters such as the protocol type and version number of the first charging protocol may be used to transmit the protocol parameter information to the electronic device.

The electronic device receives the protocol parameter information of the charging protocol transmitted by the writing interaction device, and identifies the first charging protocol adopted by the writing interaction device based on the received protocol parameter information of the charging protocol (i.e., the charging protocol parameters).

At 203, in response to the electronic device being configured with the first charging protocol, it is determined that the first charging protocol is the target charging protocol to be adopted.

The electronic device is configured with at least the second charging protocol, so that the writing interaction device can be charged at least based on the second charging protocol with the minimum configuration charging parameters.

In response to the electronic device being configured with the first charging protocol, the electronic device can effectively parse and recognize the charging protocol parameters transmitted by the writing interaction device when the writing interaction device transmits the charging protocol parameters based on the first charging protocol or based on the second charging protocol. In some embodiments, the electronic device may parse, through a configured parsing rule of the first charging protocol, the charging protocol parameters transmitted by the writing interaction device based on the first charging protocol. The electronic device may parse, through a configured parsing rule, parse the charging protocol parameters transmitted by the interaction device based on the second charging protocol, and through the protocol parameter parsing process, identify that the charging protocol adopted by the writing interaction device is the first charging protocol. Because the identified first charging protocol is the protocol configured by the electronic device, the identified first charging protocol is the target charging protocol to be adopted for the following charging process.

At 204, in response to the electronic device being not configured with the first charging protocol, it is determined that a second charging protocol configured in the electronic device is the target charging protocol to be adopted.

In response to the electronic device being not configured with the first charging protocol, if the writing interaction device transmits the protocol parameters of the charging protocol adopted by the writing interaction device based on the first charging protocol (the charging protocol adopted by the writing interaction device is the first charging protocol), the electronic device cannot parse the charging protocol parameters transmitted by the writing interaction device, That is, the parsing and identification of the charging protocol parameters fail. In this case, the electronic device determines the configured second charging protocol as the target charging protocol to be adopted for the following charging process.

If the writing interaction device transmits the protocol parameters of the charging protocol (i.e., the first charging protocol) adopted by the writing interaction device based on the second charging protocol as a backup charging protocol, the electronic device can parse, through the configured parsing rule of the second charging protocol, the charging protocol parameters transmitted by the writing interaction device based on the second charging protocol, and identify, based on the parsing result, that the charging protocol adopted by the writing interaction device is the first charging protocol. Because the electronic device is not configured with the first charging protocol, the electronic device determines the configured second charging protocol as the target charging protocol to be adopted for the following charging process.

At 102, a charging process for the writing interaction device is performed based on the target charging protocol, and one or more communication protocol parameters transmitted by the writing interaction device using the target charging protocol during the charging process are obtained.

After obtaining the target charging protocol to be adopted through the charging protocol adaptation process of the writing interaction device, the electronic device performs the charging process for the writing interaction device based on the target charging protocol. The charging process includes a charging handshake process and a charging control for the writing interaction device.

The charging control process performed by the electronic device refers to a control process to realize actual charging of the writing interaction device, for example, controlling the wireless charging transmitter on the electronic device to transmit a wireless charging signal with a predetermined power, etc. The charging handshake process is used for the electronic device to provide required communication for the charging control of the writing interaction device, for example, transmitting charging parameters such as a charging power required by the charging protocol (e.g., the first charging protocol) adopted by the writing interaction device to the electronic device through the handshake process.

In the process of performing the charging process for the writing interaction device based on the target charging protocol, the target charging protocol, such as a wireless charging protocol, of the writing interaction device is multiplexed. The target charging protocol is used to transmit protocol parameters of a communication protocol adopted by the writing interaction device to the electronic device. The communication protocol is used for writing interaction communication. By multiplexing the charging protocol of the writing interaction device, the electronic device can quickly identify the communication protocol of the writing interaction device and perform adaptation process for the communication protocol of the writing interaction device, to solve the problem of the universality of the writing interaction device and overcome existing technical problems in the existing solutions.

During the charging handshake process, the writing interaction device writes the protocol parameters of the writing interaction communication protocol adopted by the writing interaction device into the predetermined field of the predetermined data packet provided by the target charging protocol, uses the predetermined field of the predetermined data packet provided by the target charging protocol to carry the relevant parameters of the communication protocol to realize the encapsulation of the communication protocol parameters based on the target charging protocol, and transmits the communication protocol parameters to the electronic device after the encapsulation is completed.

The communication protocol parameters include but not limited to some or all of a communication protocol type, a communication protocol version number, a transmission frequency, a modulation method, and a data type.

For the case where the target charging protocol is the first charging protocol, the writing interaction device may further use a customized data packet provided by the first charging protocol to carry the charging parameters of the first charging protocol and the communication protocol parameters of the communication protocol. The charging parameters include but not limited to a charging power required by the first charging protocol. In some embodiments, the parameters of the two different types of protocols, for example, the communication protocol parameters and the charging parameters of the first charging protocol, can be transmitted at the same or different time by using the customized data packet of the first charging protocol. For example, in a same transmission, different fields of the customized data packet carry the charging parameters and the communication protocol parameters, respectively, so that the charging parameters and the communication protocol parameters can be transmitted at the same time. Alternately, in the customized data packet of different transmissions, the customized data packet in a first transmission is used to carry the charging parameters, and the customized data packet in a second transmission is used to carry the communication protocol parameters. In practical applications, specific implementation methods can be selected according to requirements.

For the case where the target charging protocol is the second charging protocol, the writing interaction device can use the predetermined field of the customized data packet provided by the second charging protocol to carry the communication protocol parameters. In this case, the minimum configuration charging parameters of the second charging protocol configured in the electronic device such as the tablet can be directly used for the charging process, so that the charging parameters are no longer carried by the second charging protocol.

During the charging handshake process, the electronic device receives the communication protocol parameters carried by the predetermined field of the predetermined data packet provided by the target charging protocol from the writing interaction device. In some embodiments, the electronic device receives the charging parameters and communication protocol parameters carried in the corresponding fields of the customized data packet provided by the writing interaction device using the first charging protocol, or receives the communication protocol parameters carried in the corresponding fields of the customized data packet provided by the writing interaction device using the second charging protocol. The electronic device parses the parameters carried in the target charging protocol, such as the communication protocol type, the communication protocol version number, the transmission frequency, the modulation mode and other communication protocol parameters, or the charging parameters such as the charging power.

In some embodiments, the charging handshake process may be performed before the actual charging of the writing interaction device based on the charging control process, or may be performed during the actual charging process. When the writing interaction device runs out of power and does not have any remaining power, the charging handshake process can be performed during the charging process. The electronic device can first perform a preliminary charging on the writing interaction device based on the minimum configuration charging parameters provided by the second charging protocol to ensure that the writing interaction device can obtain the basic power required to interact with the electronic device. On this basis, the writing interaction device performs a charging protocol adaptation process and a charging handshake process with the electronic device based on the power obtained from the preliminary charging. Then, based on the handshake process, the electronic device obtains the charging parameters required by the writing interaction device that are different from the basic charging (for example, the charging power for fast charging), and adjusts to charge the writing interaction device based on the charging parameters obtained in the handshake process.

At 103, a target communication protocol adopted by the writing interaction device is identified based on the one or more communication protocol parameters.

The electronic device identifies the target communication protocol adopted by the writing interaction device based on the obtained communication protocol parameters such as the communication protocol type, the communication protocol version number, the transmission frequency, and the modulation method.

At 104, the target communication protocol is controlled to take effect on the electronic device to communicate with the writing interaction device based on the target communication protocol in response to the electronic device receiving an interaction operation of the writing interaction device.

After the electronic device identifies the target communication protocol adopted by the writing interaction device, the electronic device controls the target communication protocol to take effect in the electronic device, to realize adaptation with the communication protocol adopted by the writing interaction device.

In some embodiments, the electronic device is configured with different types of communication protocols, and/or different versions of communication protocols corresponding to a same type. The configured communication protocols in the electronic device are used for wireless communication with the writing interaction device when the electronic device receives an interaction operation of the writing interaction device. In some embodiments, at a specific moment, only one communication protocol of the electronic device takes effect.

For the identified target communication protocol adopted by the writing interaction device, the electronic device determines whether the communication protocol currently adopted by the electronic device is consistent with the target communication protocol. If the communication protocol currently adopted by the electronic device is not consistent with the target communication protocol, the electronic device updates the communication protocol currently adopted by the electronic device to the target communication protocol, so that the target communication protocol takes effect in the electronic device. If the communication protocol currently adopted by the electronic device is consistent with the target communication protocol, the communication protocol currently in effect on the electronic device is the target communication protocol adopted by the writing interaction device, which does not need to be updated.

When the electronic device receives the interaction operation of the writing interaction device, the electronic device can communicate with the writing interaction device based on the adapted target communication protocol. For example, when a user uses a stylus to perform touch operations such as high-precision writing or painting on a tablet, mobile phone, or PC, the tablet, mobile phone, or PC receives pen pressure data, press-button data, battery status data, and etc. transmitted using wireless signals by the stylus through the adapted target communication protocol, to achieve high-precision and rapid positioning during the interaction process with the stylus through the wireless communication of the required data.

The electronic device identifies the target communication protocol adopted by the writing interaction device based on the communication protocol parameters transmitted by the writing interaction device, and controls the protocol to take effect in the electronic device, thereby realizing the adaptation of the two-terminal communication protocol of the writing interaction device and the electronic device, and accordingly achieving the purpose of general using of different writing interaction devices with the electronic device.

Aiming at the universality of the writing interaction device, some solutions have been proposed. One solution is to configure a variety of communication protocols in the writing interaction device, and set a protocol switching button on the writing interaction device. By operating the switching button (such as press and hold for 2 seconds), protocol switching is performed, to realize the adaptation of the communication protocol between the writing interaction device and the electronic device. This solution relies on the manual switching operation of the communication protocol by the user, which is not friendly to the user. The user needs to understand the communication protocol used by the electronic device and the operation method of the buttons of the writing interaction device. Another solution is that when the user uses the writing interaction device to perform writing interaction with the electronic device, before the writing interaction device and the electronic device actually communicate with each other, a monitor (detection and identification) process of the communication protocol of the writing interaction device is added on the electronic device. The electronic device, through the monitor process, identifies the communication protocol adopted by the interaction device and performs the protocol adaptation process. However, this solution increases the communication delay when the writing interaction device initially interacts with the electronic device. Because the monitor process needs to be supported, the writing interaction device and/or the electronic device need to add a corresponding software and hardware configuration, such as modulation circuit adapted to the antenna.

The writing interaction device consistent with the present disclosure realizes the transmission of communication protocol parameters by multiplexing the charging protocol, so that it is not necessary to add additional supporting software and hardware for the identification and adaptation of the communication protocol on both sides of the communication, and to add an additional detection process when the electronic device and the writing interaction device start communication and occupy scanning time to identify the communication protocol of the writing interaction device. Therefore, the cost and complexity for the devices are reduced, communication delays are avoided, and the user operation is simple. It is only required to contact the writing interaction device with the electronic device to complete the communication protocol adaptation between the two. In addition, before the communication protocol is adapted, the problem of the universality of the charging protocol of different manufacturers or different writing versions is solved by performing the charging protocol adaptation process on the writing interaction device by the electronic device first, which can ensure that the electronic device can perform charging process on the writing interaction device at least with a minimum configuration charging parameters, and accordingly ensure that the writing interaction device can be effectively adapted to the communication protocol through the charging process on the writing interaction device by the electronic device, thereby further improving a success rate of solving the universality problem of the writing interaction device.

Figure 3:
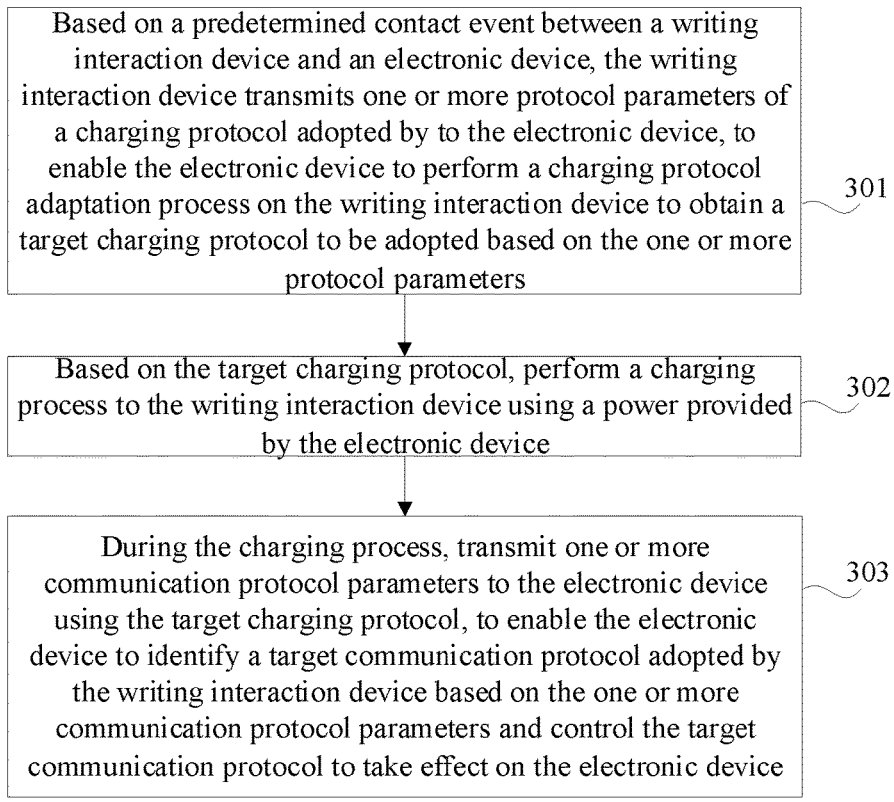
FIG. 3 is a schematic flow chart of a control method applied to a writing interaction device consistent with the embodiments of the disclosure.

FIG. 3 is a schematic flow chart of a control method applied to a writing interaction device consistent with the embodiments of the disclosure. As shown in FIG. 3, the control method includes the following processes.

At 301, based on a predetermined contact event between a writing interaction device and an electronic device, one or more protocol parameters of a charging protocol adopted by the writing interaction device are transmitted to the electronic device, to enable the electronic device to perform a charging protocol adaptation process on the writing interaction device to obtain a target charging protocol to be adopted based on the one or more protocol parameters.

The charging protocol for the writing interaction device may be charging protocols of different manufacturers or charging protocols of different versions of a same manufacturer. The predetermined contact event is a contact event between the writing interaction device and the electronic device that satisfies a preset position condition. For a more detailed description of the predetermined contact event, reference may be made to the relevant description of the embodiments of FIG. 1, which will not be repeated here.

The protocol parameters of the charging protocol transmitted by the writing interaction device to the electronic device based on the predetermined contact event with the electronic device include the protocol parameters of the charging protocol adopted or expected to be adopted by the writing interaction device. The protocol parameters of the charging protocol may include a protocol type or a version number of the first charging protocol.

After a contact event between the writing interaction device and the electronic device that satisfies the position condition occurs, the writing interaction device transmits the charging protocol adopted by the writing interaction device, such as the protocol parameters of the first charging protocol, to the electronic device.

In some embodiments, in addition to the adopted charging protocol such as the first charging protocol, the writing interaction device is also configured with a backup charging protocol, such as a second charging protocol, which can encapsulate the protocol parameters of the charging protocol adopted (e.g., the first charging protocol) based on the first charging protocol or the second charging protocol, and transmit the protocol parameters to the electronic device after the encapsulation is completed. Regarding the first and second charging protocols, and the process of encapsulating and writing protocol parameters of the charging protocol adopted by the interaction device based on the first charging protocol or the second charging protocol, reference may be made to the relevant descriptions of the embodiments of FIGS. 1 and 2, which will not be repeated here.

The electronic device performs a charging protocol adaptation process on the writing interaction device based on the received protocol parameters of the charging protocol, and obtains a target charging protocol to be adopted. The target communication protocol is the first charging protocol adopted by the writing interaction device, or the second charging protocol used as a backup charging protocol, depending on whether the electronic device is configured with the first charging protocol adopted by the writing interaction device.

At 302, based on the target charging protocol, a charging process is performed to the writing interaction device using a power provided by the electronic device.

After the electronic device obtains the target charging protocol to be adopted based on the charging protocol adaptation processing of the writing interaction device, the writing interaction device performs a charging process corresponding to the charging process performed by the electronic device based on the target charging protocol, to realize the charging of the writing interaction device. The writing interaction device is charged with a power provided by the electronic device.

Corresponding to the charging process performed by the electronic device, the charging process performed by the writing interaction device includes based on the target charging protocol, performing a charging handshake process and a charging control process on the writing interaction device.

The charging control process performed by the writing interaction device refers to some control processes performed on the writing interaction device to realize the charging of the writing interaction device, for example, controlling a wireless charging receiver of the writing interaction device to receive wireless charging signals of the electronic device at a predetermined power. The charging handshake process performed by the writing interaction device is used to provide a required communication with the electronic device for the charging control process of the writing interaction device, for example, transmitting a fast-charging power required by the writing interaction device to the electronic device through the handshake process.

At 303, during the charging process, one or more communication protocol parameters are transmitted to the electronic device using the target charging protocol, to enable the electronic device to identify a target communication protocol adopted by the writing interaction device based on the one or more communication protocol parameters and control the target communication protocol to take effect on the electronic device.

In the process of performing the charging process for the writing interaction device based on the target charging protocol, the target charging protocol, such as a wireless charging protocol, of the writing interaction device is multiplexed. The target charging protocol is used to transmit protocol parameters of a communication protocol adopted by the writing interaction device to the electronic device. The communication protocol is used for writing interaction communication.

During the charging handshake process, the writing interaction device writes the protocol parameters of the writing interaction communication protocol adopted by the writing interaction device into the predetermined field of the predetermined data packet provided by the target charging protocol, uses the predetermined field of the predetermined data packet provided by the target charging protocol to carry the relevant parameters of the communication protocol to realize the encapsulation of the communication protocol parameters based on the target charging protocol, and transmits the communication protocol parameters to the electronic device after the encapsulation is completed. The communication protocol parameters include but not limited to some or all of a communication protocol type, a communication protocol version number, a transmission frequency, a modulation method, and a data type.

For the case where the target charging protocol is the first charging protocol, the writing interaction device may further use a customized data packet provided by the first charging protocol to carry the charging parameters of the first charging protocol and the communication protocol parameters of the communication protocol. In some embodiments, the parameters of the two different types of protocols, for example, the communication protocol parameters and the charging parameters of the first charging protocol, can be transmitted at the same or different time by using the customized data packet of the first charging protocol.

For the case where the target charging protocol is the second charging protocol, the writing interaction device can use the predetermined field of the customized data packet provided by the second charging protocol to carry the communication protocol parameters. In this case, the minimum configuration charging parameters of the second charging protocol configured in the electronic device such as the tablet can be directly used for the charging process, so that the charging parameters are no longer carried by the second charging protocol.

The electronic device can identify the target communication protocol adopted by the writing interaction device based on the communication protocol parameters, for example, the communication protocol type, communication protocol version number, transmission frequency, modulation method, etc. received based on the target charging protocol, and control the target communication protocol to take effect in the electronic device.

When the electronic device receives the interaction operation of the writing interaction device, the electronic device can communicate with the writing interaction device based on the adapted target communication protocol. For example, the electronic device can receive pen pressure data, press-button data, battery status data, etc. transmitted using wireless signals through the adapted target communication protocol.

The control method applied to the writing interaction device consistent with the embodiments matches the control method applied to the electronic device consistent with the embodiments. By performing, by the writing interaction device, the adaptation of the communication protocol matching the electronic device, the purpose of universality of different writing interaction devices in the electronic device is achieved.

The writing interaction device consistent with the present disclosure realizes the transmission of communication protocol parameters by multiplexing the charging protocol, so that it is not necessary to add additional supporting software and hardware for the identification and adaptation of the communication protocol on both sides of the communication, and to add an additional detection process when the electronic device and the writing interaction device start communication and occupy scanning time to identify the communication protocol of the writing interaction device. Therefore, the cost and complexity for the devices are reduced, communication delays are avoided, and the user operation is simple. It is only required to contact the writing interaction device with the electronic device to complete the communication protocol adaptation between the two. In addition, before the communication protocol is adapted, the problem of the universality of the charging protocol of different manufacturers or different writing versions is solved by performing the charging protocol adaptation process on the writing interaction device by the electronic device first, which can ensure that the electronic device can perform charging process on the writing interaction device at least with a minimum configuration charging parameters, and accordingly ensure that the writing interaction device can be effectively adapted to the communication protocol through the charging process on the writing interaction device by the electronic device, thereby further improving a success rate of solving the universality problem of the writing interaction device.

In an example embodiment, the writing interaction device performs wireless charging based on a wireless charging protocol. The wireless charging adopts Near Field Communication (NFC) protocol to realize data transmission between the writing interaction device and the electronic device. The transmitted data includes device attributes, device parameters, and customized data of the writing interaction device.

The device attributes include but are not limited to a device ID corresponding to the writing interaction device (e.g., the NFC device ID possessed by the NFC device), a communication word length, and a timeout period. The device parameters include setting information for the device attributes (e.g., updating the setting of the device attributes such as updating the timeout period). The customized data includes but is not limited to the charging protocol adopted, charging parameters (e.g., charging power), and other data information.

Figure 4A:
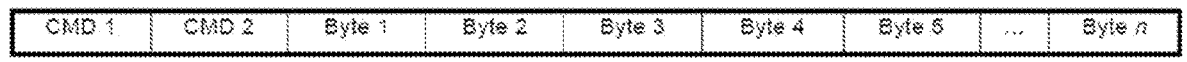
FIG. 4A is a schematic diagram showing a general near field wireless charging data packet format consistent with the embodiments of the disclosure.

FIG. 4A is a schematic diagram showing a general near field wireless charging data packet format consistent with the embodiments of the disclosure. As shown in FIG. 4A, a general data packet format for NFC wireless charging is provided. The length of the data packet is a length set in the device attributes or device parameters. In some embodiments, the length of the data packet can be 64 bytes.

Figure 4B:
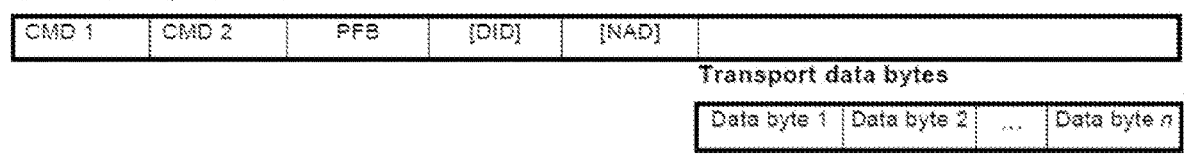
FIG. 4B is a schematic diagram showing a customized wireless charging data packet format designed by applying the general near field wireless charging data packet format of FIG. 4A consistent with the embodiments of the disclosure.

As a data packet conforming to the NFC protocol, the general data packet format is suitable for both the request packet of the electronic device to the writing interaction device, and the response packet of the writing interaction device to the electronic device. FIG. 4B is a schematic diagram showing a customized wireless charging data packet format designed by applying the general near field wireless charging data packet format of FIG. 4A consistent with the embodiments of the disclosure. The data packet is transmitted from the writing interaction device to the electronic device. The electronic device transmits an Ack signal to confirm that the data transmission between the writing interaction device and the electronic device is completed. As shown in FIG. 4B, the customized data packet includes two parts: a data transmission protocol header and transmission data (user data area).

The data transmission protocol header includes CMD1, CM2, PFB, DID, and NAD fields. CMD1, CM2 are two command fields. CMD1 is used to indicate whether the data packet type is a request packet or a response packet. CMD2 is used to indicate whether the data packet type is a device attribute packet, a device parameter packet, or a customized data packet. PFB is used to indicate the type of protocol data unit (pdu) in the data packet. DID and NAD are reserved fields.

Table 1 provides an example of different pdu types indicated by different value combinations of each bit of the PFB.

TABLE 1

| bit 8 | bit 7 | bit 6 | PFB |
| --- | --- | --- | --- |
| 0 | 0 | 0 | Information pdu |
| 0 | 0 | 1 | Protected pdu |
| 0 | 1 | 0 | ACK/NACK pdu |
| 1 | 0 | 0 | Supervisory pdu |

Other settings are RFU

In Table 1, Information pdu is used to indicate that actual data information is transmitted during the charging. Protected pdu is used to indicate that encrypted data information is transmitted. ACK/NACK pdu is used to confirm or deny whether data information is received and correctly parsed.

The user data area specifically defines relevant parameter fields for the protocol of the writing interaction device. An example of customized content is provided in Table 2.

TABLE 2

| Byte 2~Byte 3 | Byte 4 | Byte 5~19 | Byte 20~n |
| --- | --- | --- | --- |
| Feature stylus protocol | Stylus Protocol | Stylus Parameters | Reserve |

In Table 2, Byte2~Byte3 are characteristic fields customized by the user, which are used to indicate whether the subsequent customized content is related to the "communication protocol" of the writing interaction device. If and only if the content of these 2 Bytes conforms to the fixed value (for example, 0xDA0E), it can be determined that the subsequent Bytes is indeed the relevant content of the communication protocol of the writing interaction device (not the charging protocol), to carry the relevant parameters of the communication protocol by multiplexing the charging protocol of the writing interaction device. Byte4 is a field used to indicate the communication protocol (e.g., the protocol type, protocol manufacturer, and/or version, etc.) of the writing interaction device. Table 3 provides examples of different values of the Byte4 field to indicate different types of communication protocols or different versions of the protocol of the writing interaction device.

TABLE 3

| Define options | Value (hexadecimal) |
| --- | --- |
| LPP 1.0 | 01 |
| LPP 2.0 | 02 |
| MPP 1.5 | 11 |
| MPP 2.0 | 12 |
| USI 2.0 | 21 |
| USI 3.0 | 22 |
| AES 1.0 | 31 |
| AES 2.0 | 32 |
| WGP1.0 | 41 |
| Customized Protocol | 50 |
| Extend Customized Protocol(future) | 51 |
| Not applicable | FF |

In an example embodiment, based on the requirements, the Byte4 field can be filled with the communication protocol type actually used by the writing interaction device, the protocol manufacturer, and the version number, etc. For example, the communication protocol may include Lenovo Pen Protocol (LPP), Microsoft Pen Protocol (MPP), Universal Stylus Interface (USI), Active Electrical Stylus (AES), Wacom General Pen (WGP), and other existing protocols. If the communication protocol actually used by the writing interaction device is not an existing protocol, then a customized protocol can be used. The Byte4 field is configured to represent the value of "customized protocol type," such as "50" in Table 3, to indicate that the communication protocol used by the writing interaction device is the customized protocol.

If the content of Byte4 indicates that the protocol adopted by the writing interaction device is an existing communication protocol, the subsequent Byte5~Byte19 bytes are the same as Byte20~Byte n bytes, as reserve bytes. If the content of Byte4 indicates that the protocol adopted by the writing interaction device is a customized communication protocol. Byte5~Byte19 are used to represent specific parameters of the customized communication protocol. Taking the writing interaction device as a stylus as an example, the following provides an example of the specific parameters of the customized communication protocol.

Byte5~6: a pen tip signal transmission frequency, the unit is 0.5 KHz. For example, when Byte5~6 is 200, it means the signal transmission frequency is 100 KHz.

Byte7~8: a pen signal transmission frequency when the first button is pressed, the unit is 0.5 KHz. For example, when Byte7~8 is 0, it means that the button is not supported.

Byte9~10: a pen signal transmission frequency when the second button is pressed, the unit is 0.5 KHz. For example, when Byte9~10 is 0, it means that the second button is not supported.

Byte11~12: a signal transmission frequency of the end of the pen (virtual eraser), the unit is 0.5 KHz. For example, when Byte11~12 is 0, it means that the virtual eraser function is not supported.

Byte13~14: a signal bandwidth, the unit is 0.5 KHz. The signal bandwidth is applicable to all the above transmission frequencies.

Byte15~18: a signal identification code. The identification code is used to mark that the signal is indeed valid information sent by the pen, and is fixed for a certain type of pen.

Byte19: modulation mode.

In some embodiments, the first button and second button may be buttons provided on the stylus and used to simulate the functions of the left and right buttons of the mouse, respectively.

The modulation mode defined by Byte19 is shown in Table 4 below.

TABLE 4

| Modulation mode | Value |
|---|---|
| QPSK | 1 |
| PSK | 2 |

By defining a customized data packet format of the charging protocol of the writing interaction device, and using the corresponding fields of the customized data packet to carry and encapsulate the relevant information of the communication protocol of the writing interaction device, the multiplexing of the charging protocol of the writing interaction device can be achieved. By multiplexing the charging protocol of the writing interaction device, the communication protocol of the writing interaction device can be quickly recognized and adapted on the electronic device based on the predetermined contact event between the writing interaction device and the electronic device. Thereby, the universality problem of the writing interaction device is solved, and the technical problems in the existing solutions are overcome.

An electronic device consistent with the embodiments of the present disclosure is provided, which may be, but is not limited to, a smart phone, a tablet, a Personal Digital Assistant (PDA), a PC, or a multi-processor device, etc., and has a writing interaction function to interact with the writing interaction device.

Figure 5:
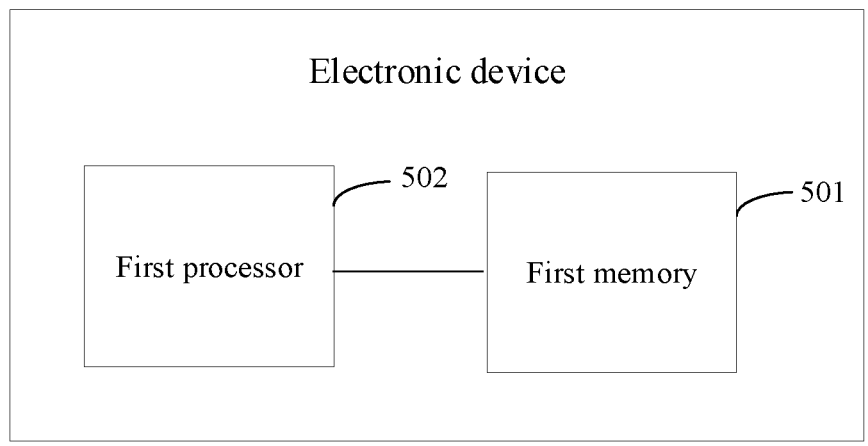
FIG. 5 is a schematic structural diagram of an electronic device consistent with the embodiments of the disclosure.

FIG. 5 is a schematic structural diagram of an electronic device consistent with the embodiments of the disclosure. As shown in FIG. 5, the electronic device includes a first memory 501 used to store computer instruction set which may be implemented in a form of a computer program, and a first processor 502 configured to implement the control method applied to the electronic device as disclosed in the above method embodiments by executing the computer instruction set.

The first processor 502 may be a central processing unit (CPU), an application-specific integrated circuit (ASIC), a digital signal processor (DSP), an application specific integrated circuit (ASIC), a field programmable Gate Array (FPGA), or other programmable logic devices, etc.

The electronic device may also include components such as a communication interface and a communication bus. The first memory, the first processor, and the communication interface may communicate with each other through the communication bus.

The communication interface is used for communication between the electronic device and other devices. The communication bus can be a Peripheral Component Interconnect (PCI) bus or an Extended Industry Standard Architecture (EISA) bus. The communication bus can be divided into an address bus, a data bus, a control bus, etc.

A writing interaction device consistent with the embodiments of the present disclosure is provided, which may specifically be, but is not limited to, a stylus that can be applied to natural human users and/or non-natural human users (e.g., an intelligent robot with automatic writing function), and has a writing interaction function with the electronic device.

Figure 6:
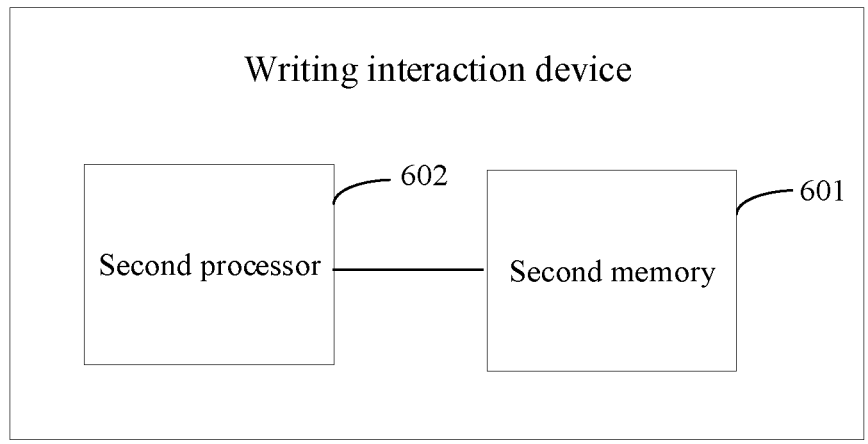
FIG. 6 is a schematic structural diagram of a writing interaction device consistent with the embodiments of the disclosure.

FIG. 6 is a schematic structural diagram of a writing interaction device consistent with the embodiments of the disclosure. As shown in FIG. 6, the writing interaction device includes a second memory 601 used to store computer instruction set which may be implemented in a form of a computer program, and a second processor 602 configured to implement the control method applied to the writing interaction device as disclosed in the above method embodiments by executing the instruction set stored in the memory.

The second processor 602 may be an application-specific integrated circuit (ASIC), a digital signal processor (DSP), an application specific integrated circuit (ASIC), a field programmable gate array (FPGA), or other programmable logic devices.

Regarding the respective functions of the electronic device and the writing interaction device, and the processes performed by the electronic device and the writing interaction to realize the identification and adaptation of the communication protocol of the writing interaction device, reference may be made to the description of the above method embodiments, which will not be described in detail here.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

The relational terms, such as "first" and "second" are only used to distinguish one entity or operation from another entity or operation, which may not indicate or imply any such actual relationship or order between the entities or operations. The terms "include," "contain," and any other variants are intended to cover non-exclusive inclusion, which cause a process, method, article, or device including a series of elements not only includes the listed elements, but also includes other elements that are not explicitly listed, or elements inherent to the process, method, article, or device. Unless otherwise defined, the use of "including a . . . " followed by an element does not exclude the existence of another same element in the process, method, article, or device.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. A control method comprising:
    in response to a predetermined contact event between a writing interaction device and an electronic device, performing, by the electronic device, a charging protocol adaptation process on the writing interaction device to obtain a target charging protocol to be adopted;
    performing, by the electronic device, a charging process for the writing interaction device based on the target charging protocol, and obtaining, by the electronic device, one or more communication protocol parameters transmitted by the writing interaction device using the target charging protocol during the charging process;
    identifying, by the electronic device, a target communication protocol adopted by the writing interaction device based on the one or more communication protocol parameters; and
    controlling, by the electronic device, the target communication protocol to take effect on the electronic device to communicate with the writing interaction device based on the target communication protocol in response to the electronic device receiving an interaction operation of the writing interaction device.

2. The control method of claim 1, wherein in response to the predetermined contact event between the writing interaction device and the electronic device, performing, by the electronic device, the charging protocol adaptation process on the writing interaction device to obtain the target charging protocol to be adopted, includes:
    detecting a relative position between the writing interaction device and the electronic device;
    in response to determining, based on the relative position, that a contact event between the electronic device and the writing interaction device satisfying a preset position condition occurs, identifying a first charging protocol adopted by the writing interaction device;
    in response to the electronic device being configured with the first charging protocol, determining that the first charging protocol is the target charging protocol to be adopted; and
    in response to the electronic device being not configured with the first charging protocol, determining that a second charging protocol configured in the electronic device is the target charging protocol to be adopted;
    wherein a charging parameter value provided by the second charging protocol is lower than a preset corresponding parameter threshold value to enable the second charging protocol to be used for charging different types of writing interaction devices.

3. The control method of claim 1, wherein performing the charging process for the writing interaction device based on the target charging protocol, and obtaining the one or more communication protocol parameters transmitted by the writing interaction device using the target charging protocol during the charging process, includes:
    performing a charging handshake process and a charging control process on the writing interaction device based on the target charging protocol; and
    during the charging handshake process, receiving the one or more communication protocol parameters carried by a predetermined field of a predetermined data packet provided by the writing interaction device using the target charging protocol.

4. The control method of claim 3, wherein receiving the one or more communication protocol parameters carried by the predetermined field of the predetermined data packet provided by the writing interaction device using the target charging protocol, includes:
    in response to the target charging protocol being the first charging protocol, receiving one or more charging parameters and the one or more communication protocol parameters carried in a predetermined field of a customized data packet provided by the writing interaction device using the first charging protocol; and
    in response to the target charging protocol being the second charging protocol, receiving the one or more communication protocol parameters carried by the predetermined field of the customized data packet provided by the writing interaction device using the second charging protocol.

5. The control method of claim 3, wherein the one or more communication protocol parameters include at least one of a communication protocol type, a communication protocol version number, a transmission frequency, a modulation mode, or a data type.

6. The control method of claim 3, wherein the charging control process includes controlling a wireless charging transmitter on the electronic device to transmit a wireless charging signal with a predetermined power.

7. The control method of claim 3, wherein the charging handshake process includes transmitting the one or more charging parameters adopted by the writing interaction device to the electronic device.

8. The control method of claim 1, wherein controlling the target communication protocol to take effect on the electronic device includes:

determining whether a current communication protocol used by the electronic device is consistent with the target communication protocol; and in response to determining that the current communication protocol used by the electronic device is not consistent with the target communication protocol, changing the current communication protocol used by the electronic device to the target communication protocol;

wherein, the electronic device is preset with different types of communication protocols or different versions of communication protocols corresponding to a same type of communication protocol, the preset communication protocols being respectively used for wireless communication between the electronic device and the writing interaction device in response to the electronic device receiving the interaction operation of the writing interaction device.

9. A control method comprising:

based on a predetermined contact event between a writing interaction device and an electronic device, transmitting, by the writing interaction device, one or more protocol parameters of a charging protocol adopted by the writing interaction device to the electronic device, to enable the electronic device to perform a charging protocol adaptation process on the writing interaction device to obtain a target charging protocol to be adopted based on the one or more protocol parameters;

based on the target charging protocol, performing a charging process to the writing interaction device using a power provided by the electronic device; and during the charging process, transmitting, by the writing interaction device, one or more communication protocol parameters to the electronic device using the target charging protocol, to enable the electronic device to identify a target communication protocol adopted by the writing interaction device based on the one or more communication protocol parameters and control the target communication protocol to take effect on the electronic device.

10. The control method of claim 9, wherein:

based on the target charging protocol, performing the charging process to the writing interaction device using the power provided by the electronic device includes:
based on the target charging protocol, performing a charging handshake process and a charging control process on the writing interaction device using the power provided by the electronic device; and during the charging process, transmitting the one or more communication protocol parameters to the electronic device using the target charging protocol includes:
during the charging handshake process, using a predetermined field of a predetermined data packet provided by the target charging protocol to carry and transmit the one or more communication protocol parameters to the electronic device.

11. The control method of claim 9, wherein the one or more communication protocol parameters include at least one of a communication protocol type, a communication protocol version number, a transmission frequency, a modulation mode, or a data type.

12. The control method of claim 9, wherein a charging handshake process includes transmitting the one or more charging parameters adopted by the writing interaction device to the electronic device.

13. An electronic device comprising:

a memory storing a computer instruction set; and a processor configured to execute the computer instruction set to:
in response to a predetermined contact event between a writing interaction device and the electronic device, perform a charging protocol adaptation process on the writing interaction device to obtain a target charging protocol to be adopted;

perform a charging process for the writing interaction device based on the target charging protocol, and obtain one or more communication protocol parameters transmitted by the writing interaction device using the target charging protocol during the charging process;

identify a target communication protocol adopted by the writing interaction device based on the one or more communication protocol parameters; and control the target communication protocol to take effect on the electronic device to communicate with the writing interaction device based on the target communication protocol in response to the electronic device receiving an interaction operation of the writing interaction device.

14. The electronic device of claim 13, wherein the processor is further configured to execute the computer instruction set to:

detect a relative position between the writing interaction device and the electronic device;

in response to determining, based on the relative position, that a contact event between the electronic device and the writing interaction device satisfying a preset position condition occurs, identify a first charging protocol adopted by the writing interaction device;

in response to the electronic device being configured with the first charging protocol, determine that the first charging protocol is the target charging protocol to be adopted; and in response to the electronic device being not configured with the first charging protocol, determine that a second charging protocol configured in the electronic device is the target charging protocol to be adopted;

wherein a charging parameter value provided by the second charging protocol is lower than a preset corresponding parameter threshold value to enable the second charging protocol to be used for charging different types of writing interaction devices.

15. The electronic device of claim 13, wherein the processor is further configured to execute the computer instruction set to:

perform a charging handshake process and a charging control process on the writing interaction device based on the target charging protocol; and during the charging handshake process, receive the one or more communication protocol parameters carried by a predetermined field of a predetermined data packet provided by the writing interaction device using the target charging protocol.

16. The electronic device of claim 15, wherein the processor is further configured to execute the computer instruction set to:

in response to the target charging protocol being the first charging protocol, receive one or more charging parameters and the one or more communication protocol parameters carried in a predetermined field of a customized data packet provided by the writing interaction device using the first charging protocol; and in response to the target charging protocol being the second charging protocol, receive the one or more communication protocol parameters carried by the predetermined field of the customized data packet provided by the writing interaction device using the second charging protocol.

17. The electronic device of claim 15, wherein the one or more communication protocol parameters include at least one of a communication protocol type, a communication protocol version number, a transmission frequency, a modulation mode, or a data type.

18. The electronic device of claim 15, wherein the charging control process includes controlling a wireless charging transmitter on the electronic device to transmit a wireless charging signal with a predetermined power.

19. The electronic device of claim 15, wherein the charging handshake process includes transmitting the one or more charging parameters adopted by the writing interaction device to the electronic device.

20. The electronic device of claim 13, wherein the processor is further configured to execute the computer instruction set to:

determine whether a current communication protocol used by the electronic device is consistent with the target communication protocol; and in response to determining that the current communication protocol used by the electronic device is not consistent with the target communication protocol, change the current communication protocol used by the electronic device to the target communication protocol;

wherein, the electronic device is preset with different types of communication protocols or different versions of communication protocols corresponding to a same type of communication protocol, the preset communication protocols being respectively used for wireless communication between the electronic device and the writing interaction device in response to the electronic device receiving the interaction operation of the writing interaction device.

\* \* \* \* \*